(12) United States Patent
Elad et al.

(10) Patent No.: US 12,332,375 B2
(45) Date of Patent: Jun. 17, 2025

(54) MIMO CHANNEL EXTENDERS WITH ASSOCIATED SYSTEMS AND METHODS

(71) Applicant: AyDeeKay LLC, Aliso Viejo, CA (US)

(72) Inventors: Danny Elad, Kibutz Matzuva (IL); Dan Corcos, Tel Aviv (IL)

(73) Assignee: Ay Dee Kay, Aliso Viejo, CA (US)

( * ) Notice: Subject to any disclaimer, the term of this patent is extended or adjusted under 35 U.S.C. 154(b) by 0 days.

(21) Appl. No.: 18/371,978

(22) Filed: Sep. 22, 2023

(65) Prior Publication Data
US 2024/0111019 A1    Apr. 4, 2024

Related U.S. Application Data

(63) Continuation of application No. 17/160,915, filed on Jan. 28, 2021, now Pat. No. 11,796,630.

(51) Int. Cl.
| | |
|---|---|
| *G01S 7/35* | (2006.01) |
| *H01Q 3/38* | (2006.01) |
| *G01S 13/02* | (2006.01) |
| *G01S 13/42* | (2006.01) |
| *G01S 13/931* | (2020.01) |

(52) U.S. Cl.
CPC ............... *G01S 7/35* (2013.01); *H01Q 3/38* (2013.01); *G01S 7/352* (2013.01); *G01S 2013/0263* (2013.01); *G01S 13/42* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 8,405,541 B2 | 3/2013 | Lee | |
| 10,218,550 B1* | 2/2019 | Kim | ............... H04B 1/0028 |
| 10,623,075 B2* | 4/2020 | Pratt | ............... H04B 7/0617 |
| 2018/0267144 A1* | 9/2018 | Lin | ............... G01S 7/4021 |
| 2019/0115989 A1 | 4/2019 | Rodriguez-Herrera | |
| 2019/0372218 A1* | 12/2019 | Vehovc | ............... H04B 17/12 |
| 2019/0383929 A1* | 12/2019 | Melzer | ............... H03L 7/0991 |
| 2020/0393553 A1 | 12/2020 | Kishigam | |
| 2021/0055376 A1* | 2/2021 | Seler | ............... G01S 7/35 |
| 2021/0156982 A1 | 5/2021 | Stettiner | |
| 2021/0173042 A1 | 6/2021 | Wu | |

* cited by examiner

*Primary Examiner* — Timothy A Brainard
*Assistant Examiner* — Ismaaeel A. Siddiquee
(74) *Attorney, Agent, or Firm* — Steven Stupp

(57) ABSTRACT

Multiple-input multiple-output (MIMO) radar systems are equipped with channel extenders to further increase the number of receive and/or transmit antennas that can be supported by a given radar transceiver. One illustrative radar system includes: a radar transceiver to generate a transmit signal and to downconvert at least one receive signal; and a receive-side extender that couples to a set of multiple receive antennas to obtain a set of multiple input signals, that adjustably phase-shifts each of the multiple input signals to produce a set of phase-shifted signals, and that couples to the radar transceiver to provide the at least one receive signal, the at least one receive signal being a sum of the phase-shifted signals. An illustrative receive-side extender includes: multiple phase shifters each providing an adjustable phase shift to a respective input signal; a power combiner that forms a receive signal by combining outputs of the multiple phase shifters.

20 Claims, 5 Drawing Sheets

MIMO CHANNEL EXTENDERS WITH ASSOCIATED SYSTEMS AND METHODS

CROSS-REFERENCE TO RELATED APPLICATIONS

The present application relates to the following applications: U.S. patent application Ser. No. 16/801,406 filed 2020 Feb. 26 and titled "MIMO Radar with Receive Antenna Multiplexing" by inventors Danny Elad, Oded Katz, and Tom Heller; U.S. patent application Ser. No. 16/203,149, filed 2018 Nov. 28 and titled "Reconfigurable MIMO radar" by inventors Danny Elad, Ofer Markish, and Benny Sheinman; and U.S. patent application Ser. No. 16/583,663, filed 2019 Sep. 26 and titled "Multi-input downconversion mixer" by inventor Benny Sheinman. Each of the foregoing applications is hereby incorporated by reference herein in their entirety.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Among the contemplated sensing technologies are multi-input, multi-output radar systems, though it can be cost-prohibitive to provide a sufficient number of transmitters and receivers for an adequately performing antenna array. The prior art fails to offer a fully satisfactory solution to this dilemma.

SUMMARY

The shortcomings identified above may be addressed at least in part by multiple-input multiple-output (MIMO) radar systems with channel extenders to further increase the number of receive and/or transmit antennas that can be supported by a given radar transceiver. One illustrative radar system includes: a radar transceiver to generate a transmit signal and to downconvert at least one receive signal; and a receive-side extender that couples to a set of multiple receive antennas to obtain a set of multiple input signals, that adjustably phase-shifts each of the multiple input signals to produce a set of phase-shifted signals, and that couples to the radar transceiver to provide the at least one receive signal, the at least one receive signal being a sum of the phase-shifted signals.

An illustrative receive-side extender includes: a set of multiple phase shifters each providing an adjustable phase shift to a respective input signal; a power combiner that forms a receive signal by combining outputs of the multiple phase shifters; and an internal memory that stores, for each of the multiple phase shifters, a different sequence of phase shift adjustments. The receive-side extender may further include an external interface that controls timing for supplying the different sequences from the memory to the multiple phase shifters.

An illustrative transmit-side extender includes: a power splitter that splits the respective transmit signal into multiple signal copies; a set of multiple phase shifters each providing an adjustable phase shift for one of the multiple signal copies; a set of power amplifiers each deriving one of the multiple output signals from an output of a corresponding one of the multiple phase shifters; and an internal memory that stores, for each of the multiple phase shifters, a different sequence of phase shift adjustments. The transmit-side extender may further include an external interface that controls timing for supplying the different sequences from the memory to the multiple phase shifters.

An illustrative radar detection method includes: generating a chirp waveform; deriving a transmit signal from the chirp waveform; obtaining a set of multiple input signals from a set of multiple receive antennas; applying adjustable phase shifts to each of the multiple input signals to provide multiple phase-shifted input signals; summing the multiple phase-shifted input signals to form a receive signal; combining the receive signal with the chirp waveform to obtain a downconverted receive signal; deriving a set of digital input signals from the downconverted receive signal; and processing the set of digital input signals to determine reflection energy as a function of distance or travel time.

The illustrative system, extenders, and method, may be employed individually or conjointly, together with one or more of the following optional features in any suitable combination: 1. the transmit signal includes a sequence of chirps. 2. the receive-side extender adjusts the phase shifts for the multiple input signals once for each chirp. 3. the adjusted phase shifts provide progressive phase shifts to the multiple input signals for beam steering. 4. the adjusted phase shifts provide code division multiplexing of the multiple input signals. 5. the radar transceiver processes the at least one downconverted receive signal to obtain a demultiplexed set of digital input signals. 6. the receive-side extender adjusts the phase-shifts for the multiple input signals multiple times during each chirp. 7. the adjusted phase shifts provide different frequency shifts, different frequency sweep rates, or different code modulations to the multiple input signals. 8. one or more transmit-side extenders that each couples to the radar transceiver to obtain a respective transmit signal and each couples to a respective set of multiple transmit antennas to provide a set of multiple output signals, each of the multiple output signals having an adjustable phase shift. 9. the transmit-side extender adjusts the phase-shifts for the multiple output signals once for each chirp. 10. the adjusted phase shifts provide the multiple output signals with progressive phase shifts for beam steering. 11. the adjusted phase shifts provide the multiple output signals with orthogonal code modulation. 12. the radar transceiver processes the at least one downconverted receive signal to obtain, for each of the transmit antennas, a demultiplexed set of digital input signals. 13. the transmit-side extender adjusts the phase-shifts for the multiple output signals multiple times during each chirp. 14. the adjusted phase shifts provide different frequency shifts, different frequency sweep rates, or different code modulations to the multiple output signals. 15. each transmit-side extender includes: a power splitter that splits the respective transmit signal into multiple signal copies; a set of multiple phase shifters each providing an adjustable phase shift for one of the multiple signal copies; and a set of power amplifiers each deriving one of the multiple output signals from an output of a corresponding one of the multiple phase shifters. 16. each of the receive-side extenders includes: a set of multiple phase shifters each providing an adjustable phase shift for one of the multiple input signals; and a power combiner that forms a respective receive signal by combining outputs of the multiple phase shifters. 17. each extender includes an internal memory to store, for each of the multiple input signals, a different sequence of phase shift adjustments. 18. each extender includes an external interface that controls timing for supplying the different sequences from the memory to the multiple phase shifters. 19. the radar transceiver supplies a clock signal to each of the extenders to control timing for suppling the sequences of phase shift adjustments from the internal memory to the multiple phase shifters. 20. said obtaining, applying, and summing are performed by a receive-side extender coupled to a radar transceiver that performs said combining, deriving, and processing.

NOMENCLATURE

The use of the terms "approximately" or "substantially" mean that a value of an element has a parameter that is expected to be close to a stated value. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "first", "second", "next", "last", "before", "after", and other similar terms are used for description and ease of reference purposes only and are not intended to be limiting to any configuration of elements or sequences of operations for the various embodiments of the present disclosure. Further, the terms "coupled", "connected" or otherwise are not intended to limit such interactions and communication of signals between two or more devices, systems, components or otherwise to direct interactions—indirect couplings and connections may also occur.

DETAILED DESCRIPTION

It should be understood that the following description and accompanying drawings are provided for explanatory purposes, not to limit the disclosure. That is, they provide the foundation for one of ordinary skill in the art to understand all modifications, equivalents, and alternatives falling within the scope of the claims. More specifically, though the following description uses vehicles as an illustrative usage context, the disclosed principles and techniques are applicable to other usage contexts such as traffic monitoring, parking spot occupancy detection, and distance measurement.

Figure 1:
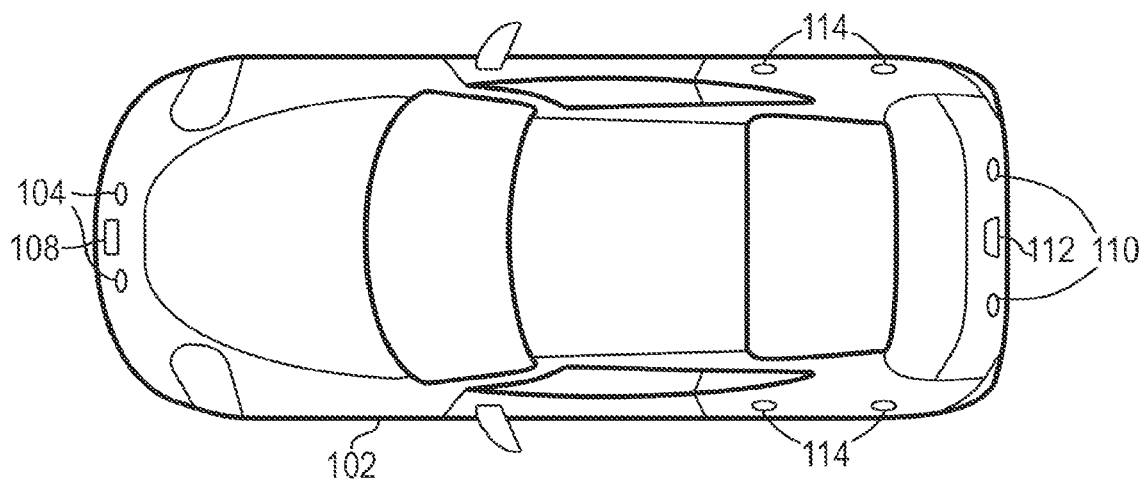
FIG. 1 is an overhead view of an illustrative vehicle equipped with sensors.

FIG. 1 shows an illustrative vehicle 102 equipped with a radar antenna arrays, including antenna arrays 104 for short range sensing (e.g., for park assist), and antenna array 108 for long range sensing (e.g., for adaptive cruise control and collision warning), each of which may be placed behind the front bumper cover. Antenna arrays 110 for short range sensing (e.g., for back-up assist) and antenna array 112 for midrange sensing (e.g., for rear collision warning) may be placed behind the cover of the rear bumper. Antenna arrays 114 for short range sensing (e.g., for blind spot monitoring and side obstacle detection) may be placed behind the car fenders. Each antenna array may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
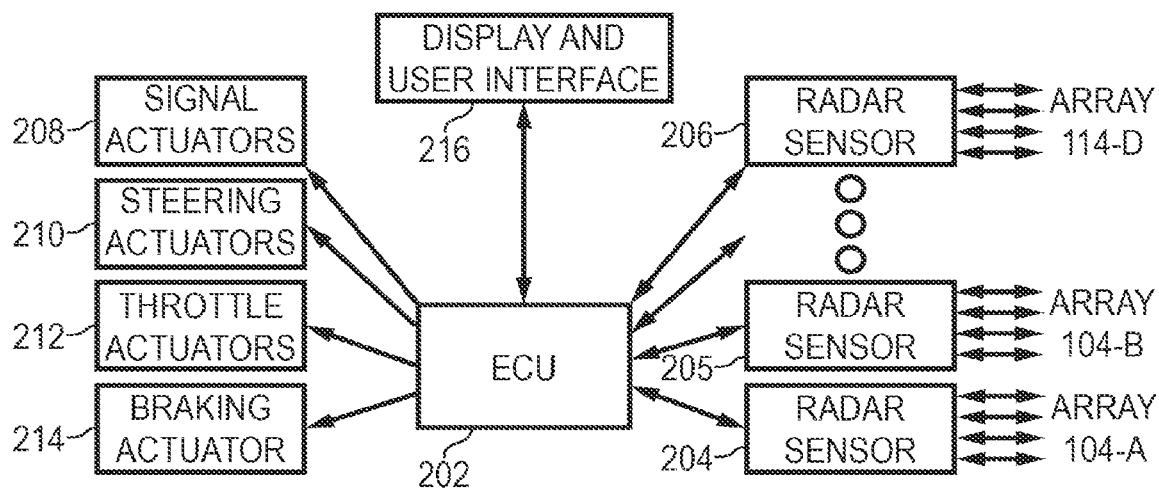
FIG. 2 is a block diagram of an illustrative driver-assistance system.

FIG. 2 shows an electronic control unit (ECU) 202 of a vehicle (e.g., 102) coupled to the various radar sensors 204-206 as the center of a star topology. Of course, other sensor bus topologies, including serial, parallel, and hierarchical (tree) topologies, are also suitable and contemplated for use in accordance with the principles disclosed herein. The radar sensors each include a radio frequency (RF) front end which couples to one of the transmit and receive antenna arrays 104A-114D to transmit electromagnetic waves, receive reflections, and determine a spatial relationship of the vehicle to its surroundings. To provide automated parking, assisted parking, lane following, lane-change assistance, obstacle and blind-spot detection, automatic braking, autonomous driving, and other desirable features, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

To gather the necessary measurements, the ECU may employ MIMO radar sensors. MIMO radar sensors operate by emitting electromagnetic waves which travel outward from a set of transmit antennas before being reflected back to a set of receive antennas. The reflector can be any moderately reflective object in the path of the emitted electromagnetic waves. By measuring the travel time of the electromagnetic waves from the transmit antenna to the reflector and back to the receive antenna, the radar sensors can determine the distance to the reflector. The use of multiple transmit or receive antennas, or the acquisition of multiple measurements at different positions, enables the radar sensors to determine the direction to the reflector and hence track the location of the reflector relative to the vehicle. With more sophisticated processing, multiple reflectors can be tracked. At least some radar sensors employ array processing to "scan" a directional beam of electromagnetic waves and construct an image of the vehicle's surroundings. Both pulsed and continuous-wave implementations of radar systems can be implemented, though frequency modulated continuous wave radar systems are generally preferred for accuracy.

Figure 3:
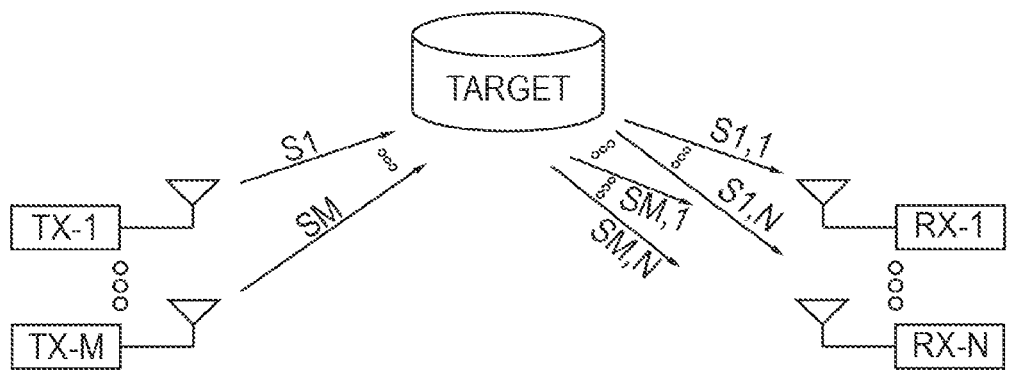
FIG. 3 is a schematic of an illustrative multi-input, multi-output (MIMO) radar system.

FIG. 3 shows an illustrative MIMO radar antenna arrangement, in which M transmitters are coupled to M transmit antennas to concurrently send M transmit signals. The M signals may variously reflect from one or more targets to be received by N receive antennas coupled to N receivers. Each receiver may acquire measurements responsive to each of the M transmit signals, thereby enabling the system to concurrently obtain N*M spatially-diverse measurements. Each such measurement can indicate the distance to multiple targets, and when combined in various ways, can further indicate the direction and velocity of each target.

Figure 4:
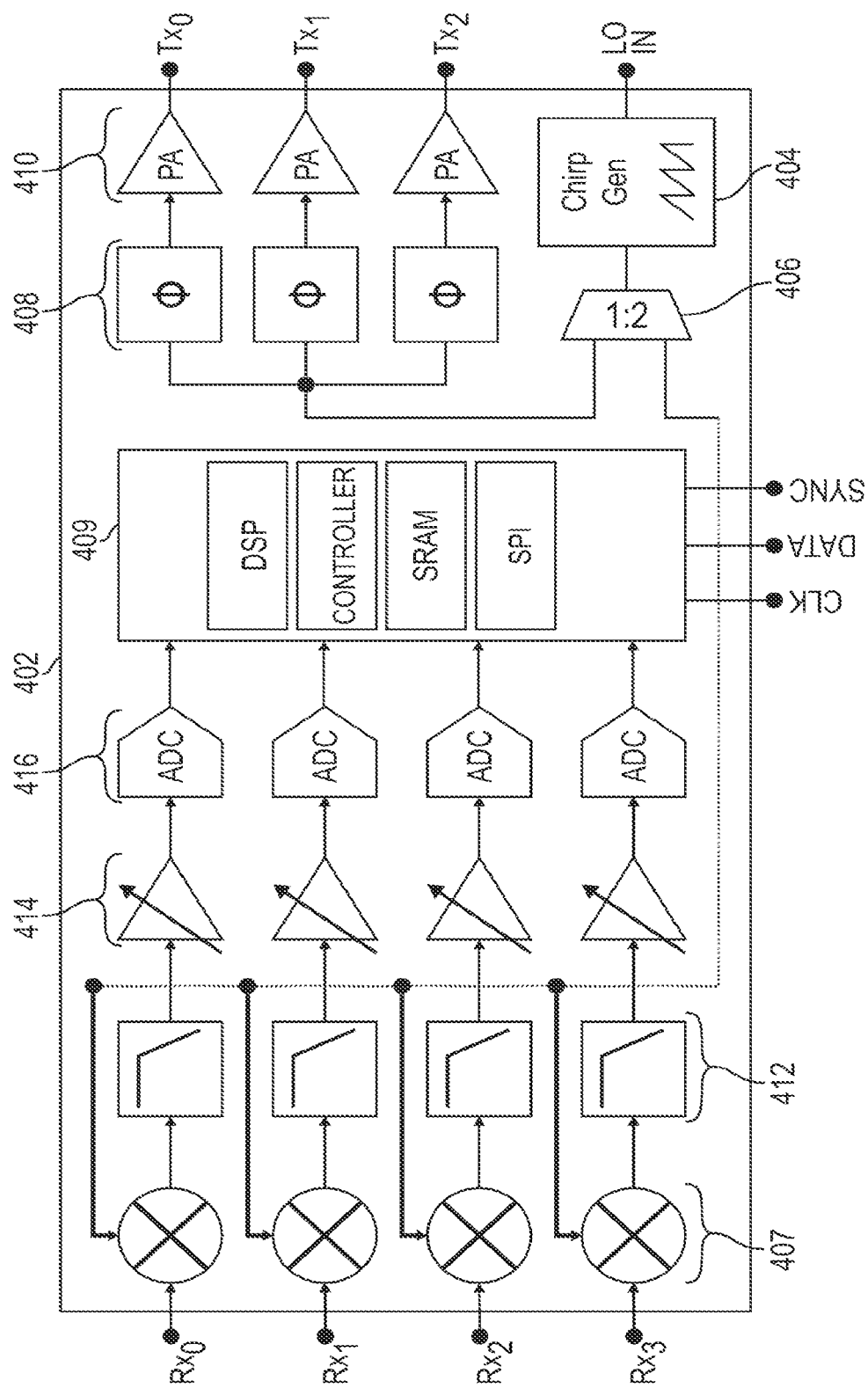
FIG. 4 is a block diagram of an illustrative MIMO radar transceiver chip.

FIG. 4 shows a block diagram of an illustrative transceiver or "RF front end" chip 402 configured for use in a MIMO radar system. The chip 402 includes a chirp generator 404 that converts a local oscillator signal into a frequency modulated continuous wave (FMCW) signal such as a signal with a series of linearly-swept frequency chirps. A power splitter 406 splits off a portion of the FMCW signal power to supply a copy of the FMCW signal to the downconversion mixers 407. The remainder of the FMCW signal passes to a set of phase shifters 408, which the controller 409 uses to phase shift the FMCW signal independently for each of the RF outputs.

The phase shifting can be used in various ways to provide, e.g., coherent beam steering or channel separation to enable virtual beam steering. Channel separation can be provided using orthogonally-coded phase modulation with a different code pattern for each channel. Alternatively, phase shifting can provide channel separation through the use of different frequency shifts, different frequency sweep rates, or spreading codes (e.g., Barker codes, maximum length sequence codes). The phase modulation can be 1-bit (bipolar phase shift keying), 2-bit (quadrature phase shift keying), or higher order (N-bit). Power amplifiers 410 take the phase-shifted FMCW signals and drive the contacts for providing transmit signals ($Tx_0$ through $Tx_2$). The illustrated transceiver provides three transmit signals, but the number can vary. The transmit signals may be provided to transmit antennas or, as discussed further below, may be provided to transmit-side extender chips to increase the number of transmit antennas driven from transceiver chip 402.

Transceiver chip 402 further includes contacts for obtaining four receive signals ($Rx_0$ through $Rx_3$) from receive antennas or, as discussed further below, from receive-side extender chips to increase the number of receive antennas supported by the transceiver chip. Downconversion mixers 407 multiply the receive signals with the copy of the FMCW signal, converting the receive signals to near baseband frequencies that are passed by low pass filters 412. Gain control amplifiers 414 adaptively adjust signal amplitudes to optimize use of the dynamic range of analog-to-digital converters (ADCs) 416. ADCs 416 digitize the receive signals for processing by controller 409. Controller 409 may take the form of a programmable digital signal processor, with fast memory (SRAM) and a serial peripheral interface (SPI), enabling it to communicate with other chips in the system.

At the signal frequencies contemplated for automotive radar (e.g., 80 GHz), it is better to keep the antenna feed lines short to minimize attenuation and electromagnetic interference. However, the relationship between the physical size of the transceiver chip and the pitch of the antenna array makes it difficult to keep the antenna feed lines acceptably short once the array size exceeds about seven or eight antennas. When employing additional chips (such as extender chips) that each support a small number of antennas (e.g., 3 or 4), the chips can be positioned near the corresponding antennas to minimize feed line length, and any inter-chip communications can be somewhat protected with the use of amplifiers and additional shielding.

Figure 5:
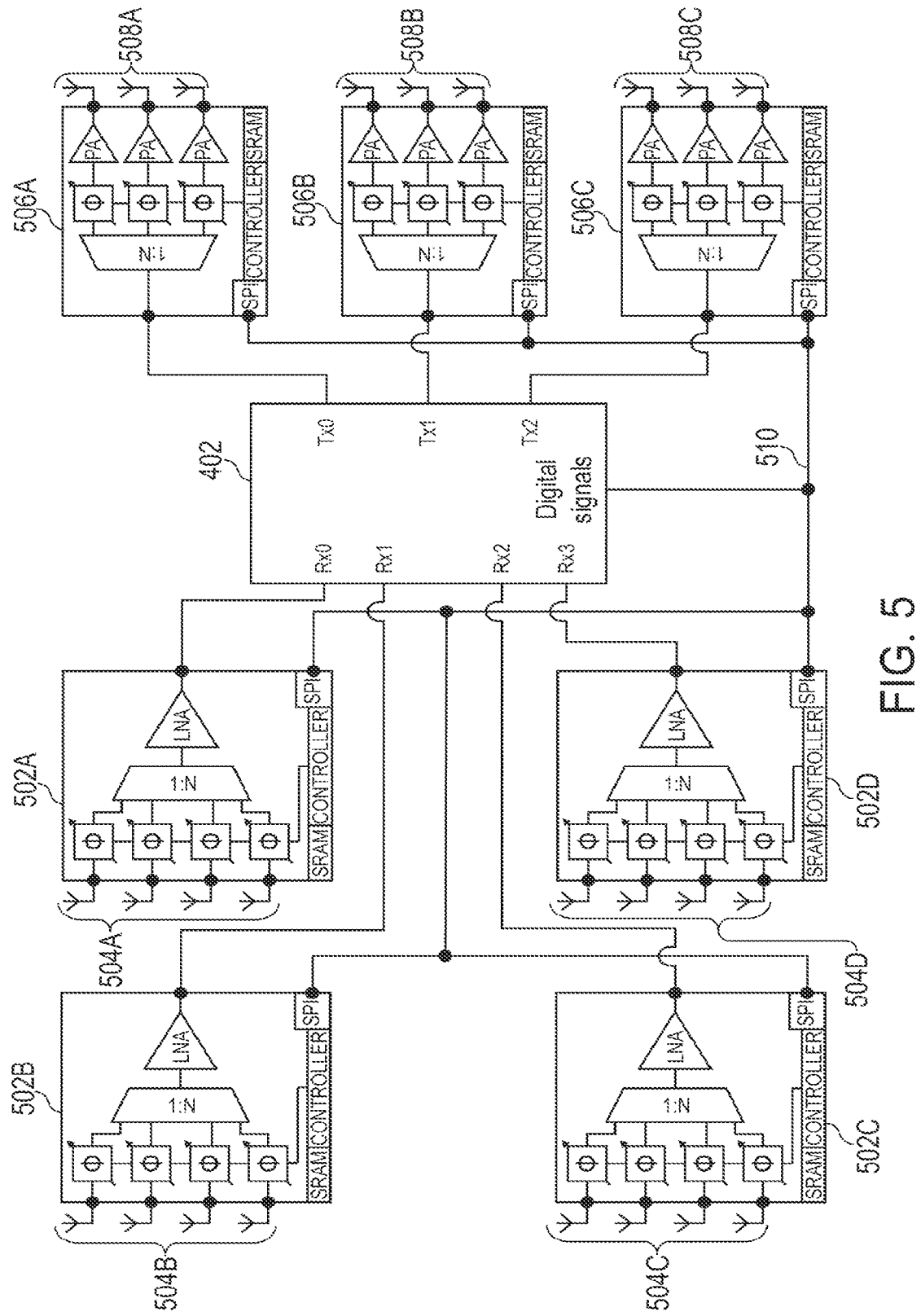
FIG. 5 is a block diagram of an illustrative MIMO radar system having extender chips.

Accordingly, FIG. 5 shows a block diagram of a MIMO radar system employing extender chips to increase the number of transmitter and receiver antennas supported by a given transceiver chip 402. Each of the four receive signal contacts is coupled to a respective receive-side extender chip 502A-502D. Each of the receive-side extender chips receives input signals from a corresponding set of receive antennas 504A-504D, provides them with adjustable phase shifts, and combines the phase-shifted signals to provide a receive signal to the transceiver chip 402. In the illustrated system, each of the receive-side extender chips combines four input signals to form a receive signal, but the number of input signals can vary.

Each of the three transmit signal contacts of transceiver chip 402 is coupled to a respective transmit-side extender chip 506A-506C. Each of the transmit-side extender chips converts a transmit signal into multiple output signals to a corresponding set of transmit antennas 508A-508C, using controllable phase shifters to phase shift or frequency shift each of the transmit signals by a desired amount or to modulate each output signal with a desired channel code. In the illustrated system, each of the transmit-side extender chips converts a transmit signal into three output signals, but the number of output signals can vary.

Transceiver chip 402 is coupled to each of the extender chips by digital control signal lines 510, which may include an SPI bus. Signal lines 510 enable the transceiver chip to program the extender chips with desired phase shifts and/or channel codes, and enables transceiver chip to control the timing of any transitions in the phase shifts.

Though not shown here, the extender chips can be employed in a hierarchical fashion. For example, rather than having the inputs of receive-side extender chip 502A coupled to antennas 504A, each of those inputs may be coupled to respective receive-side extender chips to increase the number of antennas multiplexed onto the transceiver's Rx0 channel from four to sixteen. This can be repeated for each of receive-side extender chips 502B-502D to increase the total number of receive antennas from 16 to 64. Transmit-side extender chips 506A-506C can each be similarly coupled to a second level of transmit-side extender chips to increase the number of supported transmit antennas from 9 to 27. Additional hierarchy layers can be added until limited by, e.g., the processing capabilities of the transceiver chip 402.

Figure 6:
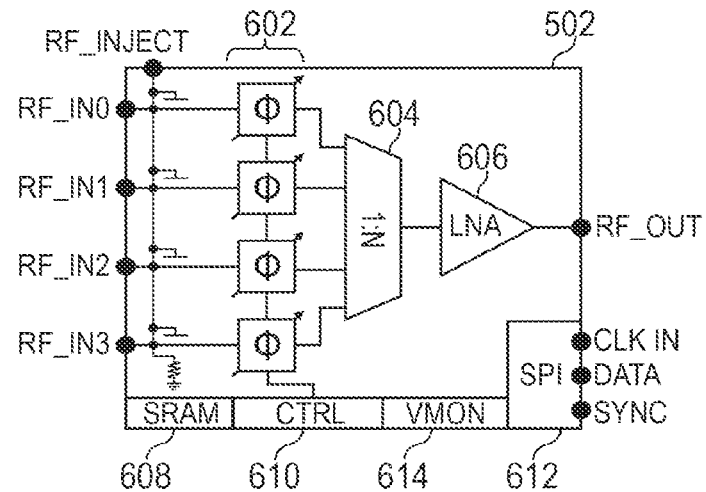
FIG. 6 is a block diagram of an illustrative input extender chip.

FIG. 6 shows an illustrative receive-side extender chip 502 having three input contacts for receive antenna signals (RF_IN1 through RF_IN3). Each input signal is coupled to one of multiple controllable phase shifters 602, and a power combiner 604 sums the phase shifter outputs to provide a composite receive signal to a low noise amplifier (LNA) 606. LNA 606 drives the composite receive signal via an output contact RF_OUT to a downstream chip such as transceiver 402. Receive-side extender chip 502 includes an on-chip controller 610 for controlling the phase shifters 602 using respective sequences of adjustable phase shifts from on-chip memory 608. While the timing of the phase shift adjustments can vary, at least some implementations apply a fixed phase shift to each chirp, switching to the next phase shift for the next chirp. This approach avoids any bandwidth expansion of the composite receive signal, but necessitates the use of multi-chirp measurements to separate the contributions of the various antennas which may potentially impact time or velocity resolution of the measurements. Alternatively, the phase shift adjustments can be made many times during each chirp to provide different frequency shifts, different frequency sweep rates, or code modulation to spread the input signal energy across a larger spectrum. While the transceiver may need to up the digitization rate, multi-chirp measurements may be avoided. The timing of the phase shift adjustments may be coordinated for all of the extender chips by the transceiver 402 via the SPI bus 612 or via another shared clock signal line.

All automotive electronics preferably include circuitry to verify proper operation. To that end, receive-side extender chip 502 may include a supply voltage monitor 614 to detect under and over-voltage, and may further include a test input (RF_INJECT) via which a test signal can be coupled to the antenna input contacts. When the test signal is applied, the transceiver 402 verifies that the test signal can be detected from each of the antenna inputs.

Figure 7:
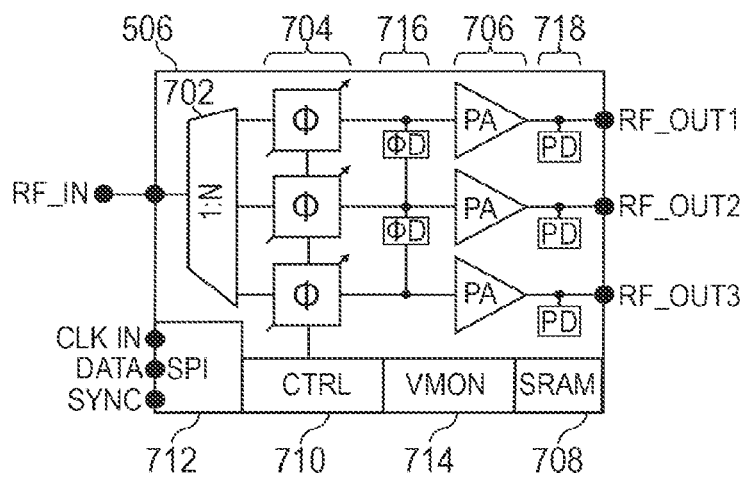
FIG. 7 is a block diagram of an illustrative output extender chip.

FIG. 7 shows an illustrative transmit-side extender chip 506 having an input contact for accepting a transmit signal (RF_IN). A power splitter splits the transmit signal into multiple copies, supplying one to each of multiple controllable phase shifters 704. The output of each phase shifter 704 is coupled to a respective transmit signal contact by a respective power amplifier 706, the transmit signal contacts being suitable for connecting to transmit antennas. Transmit-side extender chip 506 includes an on-chip controller 710 for controlling the phase shifters 704 using respective sequences of phase shift adjustments from on-chip memory 708. As with the receive-side extenders, the timing of the phase shift adjustments may be coordinated by the transceiver 402 via the SPI bus 712 or another shared clock signal line. To avoid bandwidth expansion, the transmit-side code symbol (phase shift) for each chirp may be kept fixed, only switching between chirps. Alternatively, the phase shifters may be used to provide the output signals with different frequency shifts, different frequency sweep rates, or different spreading codes.

As with the receive-side extenders, the transmit-side extenders may include circuitry to verify proper operation. For example, a supply voltage monitor 714 may detect any under or over-voltages potentially affecting operation of the components. Phase-difference detectors 716 may be included to compare phases between adjacent phase shifters 704, and power detectors 718 may be included to monitor the outputs of power amplifiers 706 for proper operation. As described in co-owned patent application U.S. Ser. No. 16/660,370, filed 2019 Oct. 22 and titled "Radar Array Phase Shifter Verification" by inventors Tom Heller, Oded Katz, Danny Elad, and Benny Sheinman, operation of the phase shifters can be periodically verified by incrementing through each of the possible combinations of phase shifter settings and verifying that the phase-difference detectors 716 measure the expected phase differences. The extender chips may notify the transceiver of any detected faults via the SPI bus.

Figure 8A:
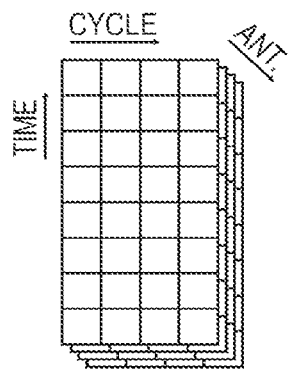
FIGS. 8A and 8B are illustrative data cubes representing an acquired set of radar measurements and a transformed set of radar measurements, respectively.

FIG. 8A shows an illustrative data cube representing a portion of the digital signal measurements that may be collected by transceiver 402. Usually, each chirp would be considered as a measurement cycle, though with the use of code multiplexing the measurement cycle may extend over multiple chirps. During a measurement cycle, the front end digitizes and separates the down-converted receive signals from the selected receive antennas, thereby providing a time-sequence of digitized receive signal samples. Due to the chirp modulation, the signal energy reflected by the targets reaches the receive antennas with a frequency offset that depends on the round-trip travel time (and hence on the distance to the target). A Fast Fourier Transform (FFT) of the time sequence collected in a given cycle will isolate the energy associated with each frequency offset, yielding a function of reflected energy versus target range. This operation, which may be referred to herein as the "range FFT", may be performed for each transmit-receive antenna pair in each measurement cycle. The range FFT yields peaks for each target having a given range.

Motion of the target relative to the antenna array adds a Doppler shift to the reflected signal energy, the Doppler shift being essentially proportional to the relative velocity. Though it is usually small relative to the range-induced frequency offset, it is nevertheless observable as a change in the phase of the associated frequency coefficients in subsequent measurement cycles. (Recall that FFT coefficients are complex-valued, having both magnitude and phase.) Applying an FFT to the corresponding frequency coefficients in a sequence of measurement cycles will isolate the energy associated with each relative velocity, yielding a function of reflected energy versus target velocity. This operation, which may be referred to herein as the "velocity FFT", may be performed for each range and each tx-rx antenna pair. The resulting two-dimensional data array possesses "peaks" for each target having a given range and relative velocity.

The reflected energy from a given target reaches the individual receive antennas in the antenna array with a phase that depends on the direction of arrival of the reflected energy (aka "angle of approach"). Applying an FFT to corresponding frequency coefficients associated with a sequence of uniformly spaced antennas will isolate the energy associated with each incidence angle, yielding a function of reflected energy versus angle of approach ("AoA"). This operation, which may be referred to herein as the "AoA FFT", may be performed for each range and velocity using a given transmit antenna.

Figure 8B:
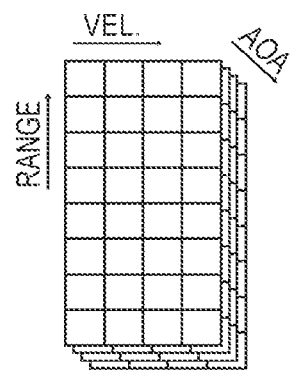

Thus, digitized signal measurements arranged in a measurement data cube having its three dimensions representing functions of time, measurement cycle, and antenna position (as shown in FIG. 8A), can be transformed into a target data cube having its three dimensions representing functions of range, velocity, and AoA (as shown in FIG. 8B). As these operations (channel separation, range FFT, velocity FFT, and AoA FFT) are linear, they can be performed in any order. Further, the FFT operations are independent (meaning that, e.g., the range FFT for a given antenna and cycle is independent of the range FFTs for other antennas and other cycles, and the velocity FFT for a given range and antenna is independent of the velocity FFTs for other ranges and antennas) enabling the FFT processing to be parallelized if desired.

Another desirable processing operation is the separation of signal energy from noise energy. Any suitable noise suppression or target detection technique may be used. One popular technique (which includes many variants) is that of constant false alarm rate (CFAR) detection. CFAR detection employs detection threshold adaptation based on measurement energy values in a sliding window near or around the measurement being evaluated (aka "cell under test"). The original technique and its variations offer various tradeoffs between performance and computational complexity by using different statistical approaches to deriving the detection threshold from the measurements within the sliding window. CFAR detection is a non-linear technique because the measurements values below the threshold are zeroed or ignored, but its position in the processing sequence may nevertheless be modified because the zeroing of frequency coefficients generally will not prevent subsequent FFTs from exploiting the relevant phase/frequency information of energy peaks representing targets.

Figure 9:
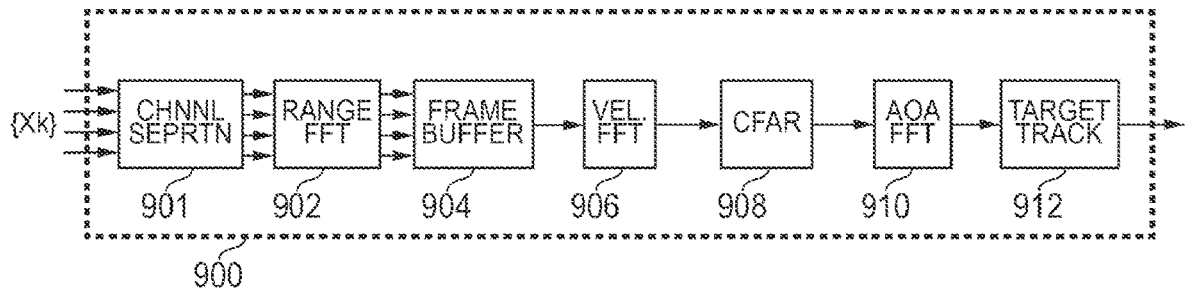
FIG. 9 is a data flow diagram for an illustrative radar system.

FIG. 9 shows an illustrative data flow 900 that may be implemented by the transceiver chip 402 or split between the transceiver chip and the ECU. As the digitized receive signals $x_k$ are obtained, the controller 409 optionally uses the phase shift adjustments applied in the transceiver, any transmit-side extenders, and/or any receive-side extenders to demultiplex the receive antenna signals and isolate the contributions from each transmit antenna, thereby separating the channels corresponding to each transmit-receive antenna pair. (If the phase shifts are being used for beam steering, this channel separation is not required.) The controller 409 may perform range FFTs 902 for each channel essentially as the signals are acquired, storing the resulting frequency coefficients as range data in a frame buffer 904. The frame buffer 904 accumulates range data from multiple measurement cycles, enabling the controller 409 to then perform velocity FFTs 906 to produce target range and velocity data for each channel as discussed previously.

A CFAR detector 908 operates on the target range and velocity data to remove noise energy below the adaptive threshold. The CFAR detector 908 may zero the below-threshold values, leaving only the above-threshold values as representing range and velocity of potential targets (radar energy reflectors). In certain contemplated variations, the CFAR detection process compresses the volume of data by omitting at least some of the below-threshold values, and by perhaps employing a more sophisticated data compression technique to reduce buffer size requirements and/or bus bandwidth requirements. The controller 409 or the ECU 202 may further perform AoA FFTs 910 to determine the relative directions associated with potential targets, and analyze any peaks in the data volume to detect and track 912 the relative position and velocities of targets relative to the vehicle.

Figure 10:
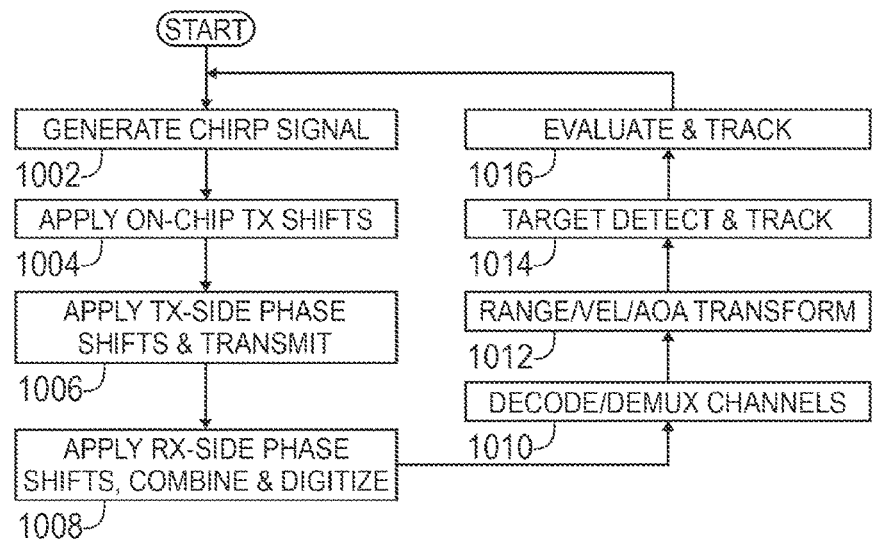
FIG. 10 is a flow chart of an illustrative radar detection method.

FIG. 10 is a flow chart of an illustrative radar detection method implementable by a MIMO radar system with extenders. It begins in block 1002 using a chirp generator 404 to generate a chirp signal having intervals where the signal frequency ramps linearly from a start frequency to an end frequency. The chirp signal can be an upward-chirp, a downward chirp, or even a triangular up-then-down chirp signal. The chirp signal is split into multiple transmit signals, and in block 1004, the transceiver 402 optionally phase applies adjustable phase shifts to the different transmit signals, e.g., to provide beam forming, orthogonal code modulation, and/or frequency shifting. In block 1006, the system uses transmit-side extender chips to further split each of the transmit signals into multiple output signals which may be further phase shifted with different sequences of phase shift adjustments before being supplied to the various transmit antennas.

In block 1008, input signals from the various receive antennas are optionally phase-shifted to provide beam steering, orthogonal coding, or frequency shifting, and the phase shifted signals are combined to form receive signals for digitization. In block 1010, the controller 409 optionally uses the phase shift sequences to separate the signals from each transmit-receive antenna pair. In block 1012, the controller 409 and/or ECU 202 transforms the signals to extract energy peaks indicative of targets, which can then be used in block 1014 to detect and track targets relative to the vehicle. In block 1016, the ECU 202 can evaluate whether the targets require any action such as, e.g., alerting the driver, or automatically braking and steering to avoid a collision, and if so, can act accordingly.

Though the operations in FIG. 10 have been described in a sequential fashion for explanatory purposes, the various operations may in practice be implemented in a concurrent or pipelined fashion. Moreover, the operations may be re-ordered or performed asynchronously in some implementations.

The use of receive-side extenders combines input signals from multiple receive antennas to enable a transceiver to support additional receive antennas. The use of transmit-side extenders conversely splits transmit signals to enable the transceiver to support additional transmit antennas. The phase modulators enable the transceiver to distinguish the individual transmit and receive antenna contributions. The phase modulators may be implemented as bipolar phase shift keying (BPSK) modulators, quadrature phase shift keying (QPSK) modulators, or higher-order phase shift keying modulators.

Numerous other modifications, equivalents, and alternatives, will become apparent to those of ordinary skill in the art once the above disclosure is fully appreciated. It is intended that the following claims be interpreted to embrace all such modifications, equivalents, and alternatives where applicable.

What is claimed is:

1. A radar system, comprising:
   a radar transceiver configured to generate transmit signals and to downconvert at least one receive signal; and
   transmit-side extenders, each coupled to the radar transceiver and each coupled to a given set of multiple transmit antennas, configured to obtain a given transmit signal in the transmit signals and to provide a set of multiple output signals, each of the multiple output signals having an adjustable phase shift,
   wherein the transmit signals and the at least one receive signal are in a band of radio frequencies that is different from baseband;
   wherein the radar transceiver is implemented on a chip and the transmit-side extenders are implemented on one or more separate second chips, the transmit-side extenders increase a number of transmit antennas supported by the radar transceiver, and the transmit-side extenders are coupled to transmit ports of the radar transceiver; and
   wherein the given transmit signal comprises a sequence of chirps, and wherein a given transmit-side extender in the transmit-side extenders is configured to adjust the phase-shifts for the multiple output signals multiple times during each chirp to provide different frequency shifts, different frequency sweep rates, or code modulation to spread input signal energy across a larger spectrum.

2. The radar system of claim 1, wherein the radar system comprises:
   a receive-side extender, coupled to a set of multiple receive antennas and coupled to the radar transceiver, comprising a power combiner, wherein the receive-side extender is configured to: obtain a set of multiple input signals, adjustably phase-shift each of the multiple input signals to produce a set of phase-shifted signals, generate the at least one receive signal by summing the phase-shifted signals using the power combiner, and provide the at least one receive signal.

3. The radar system of claim 2, wherein the set of multiple input signals are in the band of radio frequencies that is different from baseband.

4. The radar system of claim 2, wherein the receive-side extender is implemented on a separate third chip, the receive-side extender increases a number of receive antennas supported by the radar transceiver, and the receive-side extender is coupled to a receive port of the radar transceiver.

5. The radar system of claim 2, wherein the transmit signals comprise a sequence of chirps, and wherein the receive-side extender is configured to adjust the phase shifts for the multiple input signals once for each chirp.

6. The radar system of claim 2, wherein the adjusted phase shifts provide progressive phase shifts to the multiple input signals for beam steering.

7. The radar system of claim 2, wherein the adjusted phase shifts provide code division multiplexing of the multiple input signals, and wherein the radar transceiver is configured to process the at least one downconverted receive signal to obtain a demultiplexed set of digital input signals.

8. The radar system of claim 2, wherein a given transmit signal comprises a sequence of chirps, and wherein the receive-side extender adjusts the phase-shifts for the multiple input signals multiple times during each chirp.

9. The radar system of claim 2, wherein the adjusted phase shifts provide different frequency shifts, different frequency sweep rates, or different code modulations to the multiple input signals, and wherein the radar transceiver is configured to process the at least one downconverted receive signal to obtain a demultiplexed set of digital input signals.

10. The radar system of claim 2, further comprising:
a second receive-side extender, coupled to a second set of multiple receive antennas and to the radar transceiver, configured to obtain a second set of multiple input signals to provide a second receive signal,
wherein each of the receive-side extenders comprises:
a set of multiple phase shifters each configured to provide an adjustable phase shift for one of the multiple input signals;
a power combiner configured to form a given receive signal by combining outputs of the multiple phase shifters; and
an internal memory configured to store, for each of the multiple input signals, a sequence of phase shift adjustments.

11. The radar system of claim 10, wherein the radar transceiver is configured to supply a clock signal to each of the receive-side extenders to control timing for suppling the sequences of phase shift adjustments from the internal memory to the multiple phase shifters.

12. The radar system of claim 1, wherein the given transmit signal comprises a sequence of chirps, and wherein a given transmit-side extender in the transmit-side extenders is configured to adjust the phase-shifts for the multiple output signals once for each chirp.

13. The radar system of claim 12, wherein the adjusted phase shifts provide the multiple output signals with progressive phase shifts for beam steering.

14. The radar system of claim 12, wherein the adjusted phase shifts provide the multiple output signals with orthogonal code modulation, and wherein the radar transceiver is configured to process the at least one downconverted receive signal to obtain, for each of the transmit antennas, a demultiplexed set of digital input signals.

15. The radar system of claim 12, wherein the adjusted phase shifts provide different frequency shifts, different frequency sweep rates, or different code modulations to the multiple output signals, and wherein the radar transceiver is configured to process the at least one downconverted receive signal to obtain, for each of the transmit antennas, a demultiplexed set of digital input signals.

16. The radar system of claim 1, wherein each of the transmit-side extenders comprises:
a power splitter configured to split the given transmit signal into multiple signal copies;
a set of multiple phase shifters each configured to provide an adjustable phase shift for one of the multiple signal copies; and
a set of power amplifiers each configured to derive one of the multiple output signals from an output of a corresponding one of the multiple phase shifters.

17. A vehicle, comprising a radar system, wherein the radar system comprises:
a radar transceiver configured to generate transmit signals and to downconvert at least one receive signal; and
transmit-side extenders, each coupled to the radar transceiver and each coupled to a given set of multiple transmit antennas, configured to obtain a given transmit signal in the transmit signals and to provide a set of multiple output signals, each of the multiple output signals having an adjustable phase shift,
wherein the transmit signals and the at least one receive signal are in a band of radio frequencies that is different from baseband;
wherein the radar transceiver is implemented on a chip and the transmit-side extenders are implemented on one or more separate second chips, the transmit-side extenders increase a number of transmit antennas supported by the radar transceiver, and the transmit-side extenders are coupled to transmit ports of the radar transceiver; and
wherein the given transmit signal comprises a sequence of chirps, and wherein a given transmit-side extender in the transmit-side extenders is configured to adjust the phase-shifts for the multiple output signals multiple times during each chirp to provide different frequency shifts, different frequency sweep rates, or code modulation to spread input signal energy across a larger spectrum.

18. A method for transmitting radar, comprising:
downconverting, using a radar transceiver, at least one receive signal;
generating, using the radar transceiver, transmit signals based at least in part on chirp waveforms;
providing, using a given transmit-side extender in transmit-side extenders, a set of multiple output signals based at least in part on a given transmit signal in the transmit signals, each of the multiple output signals having an adjustable phase shift; and
transmitting, using a set of multiple transmit antennas coupled to the given transmit-side extender, the set of multiple output signals,
wherein the transmit signals and the at least one receive signal are in a band of radio frequencies that is different from baseband;
wherein the radar transceiver is implemented on a chip and the transmit-side extenders are implemented on one or more separate second chips, and the transmit-side extenders increase a number of transmit antennas supported by the radar transceiver; and
wherein the given transmit signal comprises a sequence of chirps, and wherein a given transmit-side extender in the transmit-side extenders adjusts the phase-shifts for the multiple output signals multiple times during each chirp to provide different frequency shifts, different frequency sweep rates, or code modulation to spread input signal energy across a larger spectrum.

19. The method of claim 18, wherein the method comprises:
obtaining a set of multiple input signals from a set of multiple receive antennas;

applying adjustable phase shifts to each of the multiple input signals to provide multiple phase-shifted input signals;

summing, using a power converter, the multiple phase-shifted input signals to form a receive signal;

combining the receive signal with the chirp waveform to obtain the downconverted receive signal;

deriving a set of digital input signals from the downconverted receive signal; and processing the set of digital input signals to determine reflection energy as a function of distance or travel time, wherein the generating the transmit signal, the combining, the deriving the set of digital input signals and the processing are performed by the radar transceiver and the obtaining, the applying and the summing are performed by a receive-side extender implemented on a separate third chip, and the receive-side extender increases a number of receive antennas supported by the radar transceiver.

20. The method of claim 18, wherein, using a receive-side extender coupled to the radar transceiver, the method comprises:

obtaining, a set of multiple input signals from a set of multiple receive antennas;

adjustably phase-shifting each of the multiple input signals to produce a set of phase-shifted signals;

generating the at least one receive signal by summing the phase-shifted signals using a power combiner in the receive-side extender; and providing the at least one receive signal.

* * * * *